(12) United States Patent
Blum et al.

(10) Patent No.: US 6,610,779 B1
(45) Date of Patent: Aug. 26, 2003

(54) AQUEOUS BARRIER LAYER BASED ON POLYURETHANE DISPERSIONS

(75) Inventors: Harald Blum, Leverkusen (DE); Jürgen Meixner, Krefeld (DE); Heino Müller, Leverkusen (DE); Joachim Petzoldt, Monheim (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/914,169

(22) PCT Filed: Feb. 14, 2000

(86) PCT No.: PCT/EP00/01205

§ 371 (c)(1),
(2), (4) Date: Aug. 24, 2001

(87) PCT Pub. No.: WO00/50482

PCT Pub. Date: Aug. 31, 2000

(30) Foreign Application Priority Data

Feb. 25, 1999 (DE) .......................... 199 07 988
Feb. 3, 2000 (DE) .......................... 100 04 723

(51) Int. Cl.$^7$ .............................. C08J 3/00; C08K 3/20; C08L 75/00
(52) U.S. Cl. ...................... 524/589; 524/590; 524/591; 524/839; 524/840
(58) Field of Search ................ 524/591, 839, 524/840, 589, 590

(56) References Cited

U.S. PATENT DOCUMENTS

| | | | |
|---|---|---|---|
| 4,968,536 A | 11/1990 | Goldner et al. | 427/388.4 |
| 5,141,987 A | 8/1992 | Nachtkamp et al. | 524/591 |
| 5,280,062 A | 1/1994 | Blum et al. | 524/591 |
| 5,342,882 A | 8/1994 | Göbel et al. | 524/832 |
| 5,349,041 A | 9/1994 | Blum et al. | 528/85 |
| 5,455,297 A | 10/1995 | Pedain et al. | 524/591 |
| 6,221,949 B1 | 4/2001 | Gross et al. | 524/451 |

FOREIGN PATENT DOCUMENTS

| | | |
|---|---|---|
| DE | 19 630 905 | 2/1998 |
| EP | 0 615 988 | 9/1994 |

OTHER PUBLICATIONS

Chemical Abstracts, vol. 112, No. 16, Apr. 16, 1990, Columbus Ohio, US; abstract No. 141452s, XP000188214 and JP 01 193367 A (Sanyo Chemical Industries, Ltd.), Aug. 3, 1989.

Primary Examiner—Patrick D. Niland
(74) Attorney, Agent, or Firm—Joseph C. Gil; John E. Mrozinski, Jr.

(57) ABSTRACT

The present invention relates to aqueous polyurethane dispersions wherein the polyurethanes are reaction products of A) at least difunctional polyols having a molecular weight of 500 to 6000, B) at least difunctional low molecular weight alcohols, C) di- and/or trifunctional isocyanates and D) compounds with an acid group and one or two hydroxy- and/or primary or secondary amino groups in an amount sufficient to provide an acid number, based on resin solids, of <25 mg KOH/g of substance, wherein i) the neutralizing agent is added in an amount sufficient to neutralize 40 to 105% of the acid groups and an amount sufficient to neutralize at least 60% of the acid groups is added prior to the chain extension reaction, ii) at least 1 wt. % of components A) and B), based on the total weight of components A) to D), are tri- or higher-functional compounds and iii) the polyurethane contains 1 to 4 wt. % of the urea groups formed by the reaction of water and isocyanate groups.

The present invention also relates to a process for preparing these polyurethane dispersions and to coating compositions containing these polyurethane dispersions.

14 Claims, No Drawings

AQUEOUS BARRIER LAYER BASED ON POLYURETHANE DISPERSIONS

BACKGROUND OF THE INVENTION

The invention relates to novel polyurethane dispersions, a process for their production and their use in aqueous binders for rapidly drying coatings in automotive painting.

In automotive production-line painting a multi-coat construction, which is obtained on an increasing scale by means of aqueous coating compounds, has become standard. Aqueous coatings frequently exhibit the problem, because of the particular problems of water as the dispersant or solvent, that in order to achieve optimum coating properties the drying has to take place at relatively high temperatures and/or for relatively long periods. Modem coatings, however, also increasingly have to meet requirements connected with a high cost-effectiveness. An important aim is e.g. to apply the coating construction in the initial automotive painting stage in individual steps that are as few and as cheap as possible, that is to say above all follow each other in quick succession. High drying temperatures, long solvent evaporation times and long drying times frustrate this requirement.

For the conventional painting construction at the initial automotive painting stage there is first of all applied to a metal surface primed by cathodic electrophoretic coating (CEC) a coat to protect against impact from flying stones and a filler coat or a combination of both ("filler protecting against impact from flying stones"). There is then applied to these coats a pigmented base coat, then a clear lacquer or alternatively a pigmented top coat.

The filler coat protecting against impact from flying stones serves to smooth out unevenness in the surface and produces through a high elasticity and deformability a good resistance to impact from flying stones. Polyesters and polyurethanes as well as polyisocyanate or melamine crosslinking agents have therefore been used to date for this coat. The filler protecting against impact from flying stones is stoved prior to the application of the base coat and the clear lacquer or top coat. This is necessary in order to improve the "take" of the top coat and to seal any defects still present in the filler coat. Further stoving then takes place after the application of the clear lacquer or top coat. This process has the disadvantage that two expensive stoving operations are required. Paints that dry rapidly naturally, i.e. without a stoving operation, such as can be formulated for example from polyacrylates, do not exhibit the required resistance to impact from flying stones, since on curing they lead to films with inadequate mechanical film properties.

The object of the present invention is to provide a binder for a barrier coat with a protective function against impact from flying stones, which ensures in addition to a good resistance to impact from flying stones in particular, a very rapid natural drying and wherein the coating obtained after the rapid natural drying possesses a very good water resistance and is resistant to incipient dissolution by the subsequently applied base or top coat. In addition the adhesion or inter-layer adhesion must also be exceptional, in order to ensure an optimum paint construction. As well as this the binder must be light-fast, in order to produce a weather-resistant coating also in the case of moderately opaque top or base coats or at points at which a pigmented top or base coat is completely dispensed with. Also required is an outstanding stability, in particular viscosity stability, of suitably formulated paints and a practical repair capability for essential repairs directly on the line.

A proposed solution for coatings resistant to impact from flying stones and/or filler coats based on aqueous binders is described e.g. in EP-A-0 330 139. As is known, the claimed dispersions of acid-functional polyesters have only a limited shelf life, as they are subject to a rapid chemical deposition by the splitting of ester bonds (e.g. Jones, T. E.; McCarthy, J. M., J. Coatings Technol. 76 (844), p. 57 (1995)).

In EP-A-0 498 156 polyester dispersions containing urethane groups are described, which are very suitable for producing intermediate primer coats protecting against impact from flying stones or stoving fillers with high resistance to impact from flying stones. In order to achieve these superior properties, however, high curing temperatures or long stoving times are required.

DE-A-3 936 794 describes polyurethane dispersions containing carbonate groups and their use in automotive painting, e.g. for base coats, namely both under stoving conditions at approx. 140° C. and in cases of repair on the line at approx. 80° C. Important requirements which these dispersions must fulfil are e.g. adhesion, weathering resistance and resistance to condensation also at 80° C. drying.

DE-A-4 438 504 describes paint layer formulations based on water-thinnable polyurethane resins with an average molecular weight Mn of 4000 to 25000 g/mole, with which the thinnest possible paint films for filler and intermediate prime coats resisting impact from flying stones can be produced.

There is nevertheless still a need for additionally improved products which are capable of meeting continually increasing requirements and which permit varied applications. In addition, a very rapid natural drying, a rapidly achievable, very good water resistance and a very high hardness-elasticity level are particularly required, something which cannot always be achieved with the products according to the prior art.

Surprisingly it has now been found that particular high molecular-weight, solvent-free polyurethane dispersions of reaction products consisting of at least one polyol component, at least one at least dihydroxy-functional low molecular-weight component, at least one hydrophilic component and at least one at least difunctional isocyanurate, wherein said polyurethane dispersions have a relatively high content of carboxylate groups and comprise isolated urea groups, are particularly well suited to meeting the requirements made of a barrier coat with a protective function against impact from flying stones. It was also found that such products can be manufactured by a very simple, and hence in particular low-cost process, consisting of a single-stage, rapidly proceeding urethanization reaction, dispersion, chain extension reaction and subsequent solvent distillation. It is possible in this way to produce high-quality, environmentally friendly products at low cost.

SUMMARY OF THE INVENTION

The invention therefore provides aqueous polyurethane dispersions from reaction products of A) at least one at least difunctional polyol of the molecular weight range 500–6000, B) at least one at least difunctional low-molecular weight alcohol, C) at least one di- and/or trifunctional isocyanate and D) at least one compound with an acid group and one or two hydroxy- and/or primary or secondary amino groups in an amount such as ensures an acid number referred to solids content of <25 mg KO/g of substance, wherein the whole amount of neutralizing agent is added prior to the chain extension reaction, wherein the degree of neutralization comes to at least 40, but not more than 105% referred to the amount of acid groups, wherein there are contained in the starting components of the polyols A) or in the low molecular-weight component B) tri- or higher-functional constituents in an amount of at least 1 wt. %, referred to the total solids amount of A) to D), and wherein a content of isolated urea groups (in the brackets of formula I) of 1 to 4 wt. % is contained.

Formula I

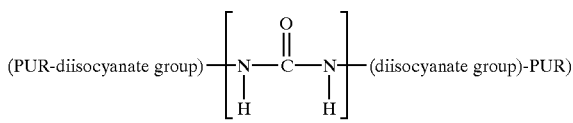

The invention also provides a process for producing polyurethane dispersions according to the invention, characterised in that there is first of all produced from the above-mentioned components A), B), C) and D) in organic solution an isocyanate-and acid-functional polyurethane prepolymer, thereafter neutralizing agent is added for at least 40, but at most 105%, of the acid groups and the prepolymer so obtained is dispersed in or with water, then optionally neutralizing agent is further added up to the maximum amount of the degree of neutralization of 105% and stirring is carried out at 25 to 75° C. until the chain extension occurring with isocyanate-water reaction is completed, wherein during or after the dispersion or during or after the chain extension reaction the organic solvent is removed down to an amount <5%.

DETAILED DESCRIPTION OF THE INVENTION

Preferably a procedure is adopted here such that neutralizing agent is added to the above-mentioned components A), B) and D) for at least 40, but not more than 105% of the acid groups, and then an isocyanate- and acid-functional polyurethane-prepolymer is prepared with component C) in organic solution and the prepolymer so obtained is dispersed in or with water, then optionally neutralizing agent is added up to the maximum amount of the neutralizing agent of 105% and agitation is carried out at 25 to 75° C. until such time as the chain extension occurring with isocyanate-water reaction is completed, wherein during or after the dispersion or during or after the chain extension reaction the organic solvent is removed down to an amount <5%.

The invention also provides the use of the polyurethane dispersions according to the invention in paints and coatings.

Suitable components A) are at least difunctional polyesters, polyethers, polyether polyamines, polycarbonates, polyester amides of the molecular range 500–6000. These can be dihydroxy polyesters from dicarboxylic acids or their anhydrides, e.g. adipic acid, succinic acid, phthalic acid anhydride, isophthalic acid, terephthalic acid, suberic acid, azelaic acid, sebacic acid, tetrahydrophthalic acid, maleic anhydride, dimeric fatty acids and diols, e.g. ethylene glycol, propylene glycol, 1,3-propanediol, diethylene glycol, triethylene glycol, 1,4-butanediol, 1,6-hexanediol, trimethylpentanediol, 1,4-cyclohexanediol, 1,4-cyclohexanedimethanol, neopentyl glycol, 1,8-octanediol. Joint use can also be made of polyesters which contain certain amounts of mono-, tri- or tetrafunctional raw materials, such as 2-ethylhexane acid, benzoic acid, soya bean oil fatty acid, oleic acid, stearic fatty acid, sunflower oil fatty acid, trimellitic anhydride, trimethylol propane, glycerin, pentaerythritol.

Use can also be made of polyesters on a lactone, in particular ε-caprolactone, base, polycarbonates, such as are available by the reacting for example of the diols mentioned above with diaryl or dialkyl carbonates or phosgene, as well as castor oil. Also suitable are polyethers, such as can be obtained e.g. with the use of diols, triols, water or amines as starter molecule by the polymerisation of propylene oxide and/or tetrahydrofuran, optionally with the additional use of small amounts of ethylene oxide and/or styrene oxide.

Preferably used components A) are difunctional polyesters with the molecular weight 840 to 2600 based on aliphatic raw materials, such as adipic acid, maleic anhydride, hexanediol, neopentyl glycol, ethylene glycol, propylene glycol, diethylene glycol, in particular aliphatic polyester diols with the molecular weight 1700 to 2100 based on adipic acid, hexanediol and neopentyl glycol.

Preferably used components A) are also aliphatic polycarbonate diols or polyester carbonate diols with the molecular weight 840 to 2600.

Quite particularly preferably the total amount of component A) consists of a mixture of 20 to 80 wt. % of an aliphatic polyester diol with the molecular weight 840 to 2100 and of 80 to 20 wt. % of an aliphatic polycarbonate diol or polyester carbonate diol with the molecular weight 1000 to 2100.

Surprisingly it was found that such a mixture produces e.g. particularly good properties with respect to rapid drying of the dispersion, combined with very good water resistance and a high level of protection of the barrier coat against impact from flying stones. If polyester diols are used alone, it is advantageous for good water resistance and resistance to hydrolysis to select particular polyester diols, e.g. those based on adipic acid, hexanediol, neopentyl glycol of the molecular weight range 1700 to 2100. The use of polycarbonate diols alone can lead to problems in the film appearance e.g. due to non-optimal flow, and in unfavourable conditions also to non-optimal inter-layer adhesion, which then makes it necessary to draw up special formulations.

Suitable low-molecular weight components B) can be e.g. ethylene glycol, 1,4-butanediol, 1,6-hexanediol, neopentyl glycol, trimethylol propane, glycerin, pentaerythritol, trimethyl-pentanediol, propylene glycol, 1,3-propanediol, 1,4-cyclohexadimethanol, or their reaction products with ethylene and/or propylene oxide. The molecular weight of B) can lie between 62 and 400.

Preferably there is used as component B) a tri- or higher-functional low-molecular weight alcohol such as trimethylol propane, glycerin, pentaerythritol or their reaction products with 1 to 6 moles of ethylene and/or propylene oxide.

Quite particularly preferred is the use of trifunctional alcohols such as trimethylol propane or glycerin in an amount of 0.5 to 4.0, preferably of 1.0 to 3.0 wt. %.

Suitable components C) can be di- and/or trifunctional aliphatic isocyanates such as hexamethylene diisocyanate, butane diisocyanate, isophorone diisocyanate, 1-methyl-2,4 (2,6)-diisocyanatocyclohexane, norbornane diisocyanate, xylyiene diisocyanate, tetramethyl xylylene diisocyanate, hexahydro xylylene diisocyanate, nonane triisocyanate, 4,4'-diisocyanatodicyclohexylmethane. Also suitable is the joint use of aromatic isocyanates such as 2,4 (2,6)-diisocyanatotoluene or 4,4'-diisocyanatodiphenylmethane, as well as higher-molecular weight or oligomeric polyisocyanates of the molecular weight range 336 to 1500 based on the above-mentioned aliphatic isocyanates.

Preferably 4,4'-diisocyanatodicyclohexylmethane and/or isophorone diisocyanate and/or hexamethylene diisocyanate and/or 1-methyl-2,4 (2,6)-diisocyanato-cyclohexane are used.

Quite particularly preferred is the use of isophorone diisocyanate and/or hexamethylene diisocyanate or of mixtures of 4,4'-diisocyanato-dicyclohexylmethane with isophorone diisocyanate or hexamethylene diisocyanate.

The quite particularly preferred components C) permit the production of particularly high-quality polyurethane dispersions for barrier coats with an exceptional level of protection against impact from flying stones and altogether satisfying properties.

Component D) consists of at least one (potentially) ionic compound with at least one acid group and at least one hydroxyl and/or amino group reactive to isocyanate groups.

In the case of these compounds use is preferably made of at least one carboxylic acid comprising preferably one or two hydroxyl and/or amino groups. Suitable acids of this kind are for example 2,2-bis(hydroxymethyl) alkanecarboxylic acid such as dimethylol acetic acid, 2,2-dimethylol propionic acid, 2,2-dimethylbutyric acid or 2,2-dimethylol-pentane acid, dihydroxy-succinic acid, hydroxypivalic acid or mixtures of such acids. Preferably dimethylol propionic acid and/or hydroxypivalic acid is used as component D). Also possible, although less preferable, is the use as an anionic construction component D) of sulfonic acid diols comprising optionally ether groups of the kind described in U.S. Pat. No. 4,108,814. The free acid groups represent the above-mentioned "potentially ionic" groups, while the salt-type groups obtained by neutralizing with neutralizing agents, in particular carboxylate groups, are "ionic" groups.

Component D) is used in amounts such that the acid number referred to solids content of the dispersion is <25, preferably <20 mg/KOH g of substance.

Surprisingly it was found that despite the relatively high acid number or the resulting high content of salt groups, e.g. carboxylate groups, dispersions are obtained which permit the production of barrier coats with very rapidly achieved, early water resistance. Despite the high salt group content and the high molecular weight of the dispersions according to the invention it is possible, surprisingly, to formulate paints for barrier coats with an extraordinarily high mechanical, e.g. hardness-elasticity, level and an excellent level of protection against impact from flying stones, which possess with application consistency a solids content of 50 wt. % or more.

In the production of polyurethane dispersions, in addition to the construction components A), B), C), D), joint use can optionally also be made of a component E) on a small scale, in amounts <4 wt. %. Components E) can be nonionic-hydrophilic polyethers, which comprise per molecule one or two groups reactive to isocyanate groups, in particular hydroxyl groups, and preferably have a molecular weight Mn of 350 to 2500.

The aqueous polyurethane dispersions according to the invention contain preferably reaction products of A) 50 to 80 wt. % of at least one at least difunctional aliphatic polyol based on polyester, polyester carbonate and/or polycarbonate with the molecular weight 840 to 2600, B) 0.5 to 4 wt. % of at least one at least difunctional, low-molecular weight alcohol with molecular weight 62 to 400, C) 18 to 38 wt. % of at least one di- and/or trifunctional isocyanate and D) 2.5 to 6 wt. % dimethylol propionic acid and/or dimethylol butyric acid and/or hydroxypivalic acid and E) less than 4 wt % of nonionic—hydrophilic, monofunctional polyether with molecular weights of 350 to 2500,
wherein the whole amount of neutralizing agent is added prior to the chain extension reaction,
wherein the degree of neutralization comes to at least 40, but not more than 105% referred to the amount of acid groups,
wherein there are contained either in the starting components of the polyols A) or in the low molecular-weight component B) tri- or higher-functional constituents in an amount of at least 1 wt. %, referred to the total solids amount of A) to D), and wherein there is contained a content of isolated urea groups (in the brackets of formula I) of 1 to 4 wt. %.

Particularly preferred aqueous polyurethane dispersions according to the invention contain reaction products from A) 55 to 75 wt. % of a mixture of 20 to 80 wt. % of an aliphatic polyester diol of the molecular weight 840 to 2100 and of 80 to 20 wt. % of an aliphatic polycarbonate diol or polyester carbonate diol of the molecular weight 1000 to 2100, B) 1 to 3 wt. % of a trifunctional, low-molecular weight alcohol, in particular trimethylol propane or glycerin, C) 20 to 35 wt. % of isophorone diisocyanate and/or hexamethylene diisocyanate and/or a mixture of 4,4'-diisocyanatodicyclohexylmethane with isophorone diisocyanate or hexemethylene diisocyanate, D) 3.5 to 4.9 wt. % of dimethylol propionic acid.

The reacting of the hydroxy-functional components A), B), D) and optionally E) with the isocyanate-functional component C) takes place in manner known per se in one or more stages, wherein the quantitative ratios of the reactants are so selected so that the equivalent ratio of NCO:OH groups is 2.5:1 to 1.2:1, preferably 1.7:1 to 1.4:1. The reaction can be carried out with the addition of small amounts of catalysts such as e.g. dibutyltin dilaurate, tin-2-octoate, dibutyltin oxide or diazabicyclononane.

In order to prevent viscosity, stirring, mixing and heat dissipation problems, the reaction is carried out in 35 to 97% organic solution, particularly preferably in 55 to 75% acetone solution.

Prior to the dispersing of the organically dissolved, NCO-functional polyurethane prepolymer or else already prior to the reacting of components A), B) and D) and optionally E) with the isocyanate-functional component C) neutralizing agent is added for at least 40, preferably at least 50%, but not more than 105% of the acid groups.

It is also possible to add the neutralizing agent to the dispersing water.

Preferred neutralizing agents are e.g. triethylamine, N-methyl morpholine, dimethy-isopropylamine, likewise suitable can be e.g. diisopropylaminoethanol, dimethyl ethanolamine, dimethyl isopropanolamine. Mixtures of different neutralizing agents can also be used. Ammonia is likewise suitable as a neutralizing agent in some cases.

Particularly preferred is diethyl isopropylamine, optionally as a mixture with other amines.

After the dispersing of the polyurethane prepolymer in/by water, stirring is performed until all the isocyanate groups have fully reacted due to isocyanate-water reaction with chain extension via isolated urea structural elements. Further neutralizing agent can also optionally be added at a later stage, wherein the degree of neutralization referred to included acid groups comes to not more than 105%.

The solvents used to produce the polyurethane prepolymer can be separated partially or preferably completely out of the dispersion by distillation. Preferably dispersions according to the invention contain less than 5 wt. %, particularly preferably practically no organic solvent.

The distillation takes place in such a way that no neutralizing agent used is distilled off at the same time. Should this be the case, however, due to the selection of unfavourable distillation conditions, the corresponding amount of neutralizing agent is then added to the dispersion again.

During the chain extension of the isocyanate-functional polyurethane prepolymer in water there can optionally be added for up to 40% of the isocyanate groups present mono-, di- or trifunctional chain extension or chain termination agents of the known kind, which can optionally also contain ionic groups, acid groups or hydroxyl groups. Preferably, however, a chain extension is carried out exclusively via the isocyanate-water reaction.

The dispersions according to the invention have a content of isolated urea structural units (mathematically determinable and referred to 100% solids content) of the following kind (formula in square brackets):

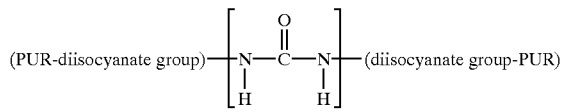

of 1.0 to 4.0%, preferably of 1.75 to 3.25%.

The calculation takes place on the assumption that half of the isocyanate groups of the polyurethane prepolymer react with water to form amino groups, accompanied by $CO_2$ separation, which amino groups then react with the 2nd half of the isocyanate groups, accompanied by the formation of isolated monourea bridges, with an increase in molecular weight.

The dispersions according to the invention have particle diameters, determined e.g. by laser correlation spectroscopy measurements, of 20 to 600, preferably of 50 to 150 nm.

The solids content of the dispersions comes to at least 30, preferably at least 35%. The pH value of the dispersion lies below 8.5, preferably below 7.8. The average molecular weights Mn of the dispersion are >20000, preferably >30000 and quite particularly preferably >40000 g/mole (determined e.g. by gel permeation chromatography). In a particular embodiment there are included proportionately in the dispersion very high-molecular weight portions that are no longer completely soluble in organic solvents. These then defy a molecular weight determination.

The products according to the invention are suitable for the coating or painting of any substrates, in particular wood, ceramics, stone, concrete, bitumen, moulded fibre, glass, china, plastics and metal substrates of the most varied kind. In addition, they can be used as a finish or dressing in textile or leather coating.

The preferred field of use is the initial painting of vehicles, in particular as a barrier coat with a high level of protection against impact from flying stones and exceptional water resistance.

For the use according to the invention of the dispersions according to the invention there can be added to the latter the conventional auxiliary substances and additives. The latter include for example inorganic or organic pigments, fillers such as, for example, carbon black, silica, talc, chalk, siliceous earth, kaolin, glass as powder or in the form of fibres, cellulose or cellulose acetate butyrate, as well as crosslinking agents such as blocked polyisocyanates, polyisocyanates, melamine resins, urea resins, urea-aldehyde resins, carbodiimides, carbamates, tris (alkoxycarbonylamino)-triazines, carbamate-modified amino-crosslinking resins. The crosslinking agents can be used in water-dispersible or in non-water-dispersible form.

Examples of suitable polyisocyanates based on blocked polyisocyanates are cycloaliphatic or aliphatic polyisocyanates such as hexamethylene diisocyanate (HDI), 1-isocyanato-3,3,5-trimethyl-5-isocyanatomethylcyclohexane (isophorone diisocyanate, IPDI), methylene-bis-(4-isocyanatocyclohexane), tetramethylxylylene diisocyanate (TMXDI). Preferably suitable are polyisocyanates that contain hetero atoms in the group containing the isocyanate groups. Examples of these are polyisocyanates comprising carbodiimide groups, allophonate groups, isocyanurate groups, urethane groups and biuret groups. Particularly well suited to the invention are the known polyisocyanates that are used mainly in the production of paints, e.g. modification products, comprising biuret-, isocyanurate- or uretdione groups, of the above-mentioned simple polyisocyanates, in particular of hexamethylene diisocyanate or isophorone diisocyanate. Also suitable are polyisocyanates containing low-molecular weight urethane groups, such as can be obtained by reacting IPDI or TDI used in excess with simple polyvalent alcohols of the molecular weight range 62–300, in particular with trimethylol propane or glycerin. Any mixtures of the above-mentioned polyisocyanates can also be used to produce the products according to the invention. Further suitable polyisocyanates are the known prepolymers comprising terminal isocyanate groups, such as are obtainable in particular by reacting the above-mentioned simple polyisocyanates, in particular diisocyanates, with deficient amounts of organic compounds with at least two functional groups reactive to isocyanates.

The isooctane groups of the polyisocyanates are blocked. Conventional compounds can be used as blocking agents, such as are used for example in the paint sector. Examples of suitable blocking agents are dimethyl malonate, diethyl malonate, ethyl acetoacetate, caprolactam, secondary aliphatic amine, butanone oxime, 3,5-dimethyl pyrazole.

The blocked polyisocyanates described can be used in non-hydrophilic form, wherein the transfer into the aqueous dispersion can be obtained e.g. by mixing and joint dispersion with the polyurethane prepolymer. The polyurethane dispersion according to the invention can however also be used as a polymeric emulsifier for non-water-dispersible crosslinking agents on their own. It is also possible to add to the polyurethane dispersion according to the invention a hydrophilic blocked polyisocyanate that is water-dispersible or already present in water-dispersible form. Hydrophilic blocked polyisocyanates are known and e.g. described in EP-A-0 566 953.

Preferably used as crosslinking agents are reactive amino-crosslinking resins or melamine resins such as ®Cymel 328 (Cytec) or/and trisalkoxy-carbonylaminotriazines such as ®TACT (Cytec) or/and reactive, e.g. malonic ester-blocked polyisocyanate crosslinking agents and/or urethanised melamine resins.

The polyurethane dispersions according to the invention can be combined with further binders. Preferred is the combination with water-soluble or water-insoluble melamine resins as well as water-emulsifiable or water-dispersible polyester resins or polyester-polyurethane resins.

The handling of the dispersion for producing coatings can take place according to any methods, for example by brushing, pouring, spraying, dipping, rolling or knife coating.

The dispersions according to the invention are suitable e.g for producing paints, coatings, sealants and adhesives.

The drying of the products obtained by various application techniques can take place at room temperature or at elevated temperatures of up to 200° C., preferably at 60–150° C.

In the preferred use according to the invention as a coating which dries naturally and very rapidly at low temperatures in initial vehicle painting as a barrier coat with a high level of protection against impact from flying stones, the application preferably takes place by spraying and the drying preferably for 5 to 10 minutes at 50 to 80° C.

The dry film coat thickness can for example lie between 15 and 50 μm, but coatings with higher coat thickness are possible. The coating can be adjusted to be highly flexible, but also hard, depending on the range of requirements. After drying the barrier coat is sandable and very easy to overpaint. After the overpainting with a base coat/clear lacquer or a pigmented top coat, a common stoving operation then takes place, e.g. for 20–25 minutes at 120–160° C.

The coating produced in this way results in optical and mechanical qualities that are comparable to or better than a paint construction in which, instead of the barrier coat, a filler used in the conventional manner with e.g. 35–45 μm dry film coat thickness, with its own stoving operation of e.g. 20–25 minutes at 135–165° C., and additionally base coat/clear lacquer or else top coat are applied.

The dispersions according to the invention can be mixed with other ionic or nonionic dispersions or aqueous solutions, e.g. with polyester-polyvinyl acetate, polyethylene, polystyrene, polybutadiene, polyurethane, polyvinyl chloride, polyester-polyacrylate, polyacrylate and copolymer dispersions or solutions. The addition of emulsifiers known per se that are not fixed chemically and are preferably ionic is also possible.

Preferred is the joint use of water-soluble or water-dispersible polyesters, polyester-polyurethanes, polyester-polyacrylates as well as other polyurethane dispersions, in particular of polyurethane dispersions with rapid natural drying and high hard segment characteristics.

Paints according to the invention for barrier coats contain in addition to additives and auxiliary substances conventional in initial automotive painting and optionally water for adjusting the spraying consistency a) 30 to 90, preferably 45 to 75 wt. % of polyurethane dispersions according to the invention,
b) 0 to 20, preferably 1 to 10 wt. % of crosslinking agents,
c) 5 to 70, preferably 10 to 44 wt. % of pigments and/or fillers,
d) 0 to 65, preferably 10 to 44 wt. % of other binders, preferably aqueous polyester or polyester-polyurethane solutions or dispersions.

The paints according to the invention for barrier coats comprise solids contents of at least 45, preferably at least 50% with application consistency and also exhibit a very good storage viscosity stability in the presence of highly reactive crosslinking agents for stoving paints, e.g. based on melamine resin.

At the same time the barrier coats prepared from the dispersions according to the invention have an outstanding resistance to impact from flying stones and a very good adhesion and inter-layer adhesion.

The polyurethane dispersions according to the invention can also be used to produce reactive stoving paints curable at low temperatures, in particular stoving fillers. Moreover, they are preferably combined with the reactive crosslinking resins mentioned above and optionally other polymers in such a way that curable coatings are obtained at 90 to 120° C. optionally with the additional use of suitable catalysts and the conventional pigments, additives and auxiliary substances.

The invention will be explained by means of the following examples:

EXAMPLE 1 (ACCORDING TO THE INVENTION)

144 g of an aliphatic polycarbonate diol (Desmophen® 2020, Bayer AG, molecular weight 2000), 108 g of a polyester diol based on adipic acid, hexane diol and neopentyl glycol (molecular weight 2000) and 17.6 g of dimethylpropionic acid are weighed under nitrogen atmosphere into a dry 2 l reaction vessel with stirring, cooling and heating equipment and heated to 65° C. 6.0 g of trimethylol propane, 200 g of acetone, 59.5 g of isophorone diisocyanate and 39.0 g of hexemethylene diisocyanate are then added and heated to reflux temperature. Heating is carried out until the theoretical isocyanate value is reached or fallen slightly below. After cooling to 60° C., 10.0 g of triethylamine (degree of neutralization, i.e. percentage of the carboxyl groups converted into the salt form, is 75%) and thereafter 550 g of distilled water are added. Stirring is carried out at 40 to 50° C. until free isocyanate groups are no longer detectable. The acetone is then removed by distillation. An approx. 40% fine-divided dispersion 1) with a pH value of 7.3 and a viscosity of approx. 200 mPas/23° C. is obtained.

EXAMPLE 2 (COMPARISON)

Polyester dispersion containing urethane groups according to EP-A-0 498 156, Example 2), approx. 41% solids content, viscosity approx. 1000 mPas/23° C.

APPLICATION EXAMPLE 3 (ACCORDING TO INVENTION)

Production of a Barrier Coat

A paint for a barrier coat 3) is produced from 117 g of a pigment paste A), 182 g of the dispersion 1), 9.8 g of amino-crosslinking resin (®Cymel 328, Cytec) and 10 g of distilled water. The paint has a pH value of 7.6, a solids content of 52% and a flow time in the ISO 5 cup of 21 seconds. After 14 days' storage of the paint at room temperature the viscosity has increased only slightly (24 seconds).

A) The pigment paste is produced from the following raw materials by grinding on a pearl mill: 42.2 g ®Bayhydrol D270 (water-dispersible polyester resin, dissolved 70% in organic solvents, Bayer), 82.4 g distilled water, 6 g of a 10% aqueous solution of dimethyl ethanolamine, 5.4 g of a 50% solution of ®Surfynol 104 (wetting auxiliary, Air Products) in NMP, 5.4 g ®Additol XW 395 (Vianova Resins), 108.2 g ®Bayertitan R-FD-I (titanium dioxide, Bayer), 1.2 g ®Bayferrox 303T (iron oxide, Bayer), 108.9 g ®Blanc fixe micro (Sachtleben), 26.6 g ®Talkum IT extra (Norwegian Talk) and 3.7 g ®Aerosil R 972 (Degussa).

The following paint construction is applied to plates provided with a cathodic electrodeposition painting (CEC) and cured as follows:

a) barrier coat 3), 20 μm dry film thickness, 10 minutes 70° C. surface drying, b) commercial base coat, black, 15 μm dry film thickness, 10 minutes with 80° C. surface drying, c) commercial medium solids clear lacquer, 40 μm dry film thickness, 25 minutes 145° C. stoving.

The following test results were then obtained:

Appearance of the coating after application: In order.

Inter-layer adhesion barrier coat/top coat: (marks from 1 to 3, 1 is very good, 3 is poor): 1

Interlayer adhesion barrier coat/CEC (marks from 1 to 3, 1 is very good, 3 is poor): 1

Resistance to impact from flying stones (marks from 1 to 10, 1 is very good, 10 is very poor): 1

Testing in a repair case, i.e. base coat and clear lacquer are tested and cured once again in the paint construction as described above (i.e. a total of 6 coats of paint are then present on the plate on top of one another):

Spalling of filler (marks from 1 to 7, 1 is very good, 7 is very poor): 1

Resistance to impact from flying stones (marks from 1 to 10, 1 is very good, 10 very poor): 1

In order to check the water resistance of the barrier coat, a film with 20 μm dry film thickness is applied and is surface dried for 10 minutes at 70° C. The sensitivity to water swelling is then measured (marks 0 to 5, 0 means no effect, 5 means film dissolved): 1

In order to check the film hardness and the incipient solubility, a film with 20 μm dry film thickness is applied, dried for 5 minutes at 80° C. and stoved for 22 minutes at 145° C.

Film hardness: 58 pendulum seconds (Köbnig)

Solvent resistance (incipient solubility test with one minute of exposure to the following solvents: toluene, methoxypropyl acetate, ethyl acetate, acetone, rating 0 to 5, 0 is unchanged, 5 is dissolved): 2/2/2/2

Dispersion 1) meets all the requirements which are made of a barrier coat.

APPLICATION EXAMPLE 4 (COMPARISON)

As described in Example 3), a paint for a barrier coat is produced with the use of comparison dispersion 2) instead of dispersion 1), corresponding coatings are applied and cured, and the properties are tested.

The following test results were obtained:

Paint solids: 51%, pH value 7.5

Appearance of the coating after the application: Not in order, base coat does not adhere optimally to the barrier coat, it cracks.

A test for adhesion or protection against impact from flying stones in the paint construction is not possible.

Checking of the water resistance of the barrier coat after 10 minutes' drying at 70° C. drying: 5

Film hardness: 14 pendulum seconds (König)

Solvent resistance: 4/3/4/4

The comparison product is unsuitable as a barrier coat, moreover solvent resistance and in particular the film hardness and the water resistance are inadequate.

EXAMPLE 5 (COMPARISON)

144 g of an aliphatic polycarbonate diol (Desmophen® 2020, Bayer AG, molecular weight 2000), 108 g of a polyester diol based on adipic acid, hexane diol and neopentyl glycol (molecular weight 2000) and 17.6 g of dimethylpropionic acid are weighed under nitrogen atmosphere into a dry 2 l reaction vessel with stirring, cooling and heating equipment and heated to 65° C. 6.0 g of trimethylol propane, 200 g of acetone, 59.5 g of isophorone diisocyanate and 39.0 g of hexemethylene diisocyanate are then added and heated to reflux temperature. Heating is carried out until the theoretical isocyanate value is reached or fallen slightly below. After cooling to 60° C., 5.8 g of ethylene diamine diluted with 30 g water are added within 5 minutes, which corresponds to a chain extension degree of approx. 60% (i.e. reactive amino groups in the form of a diamine are added for approx. 60% of the isocyanate groups still remaining), after 15 minutes' stirring 10.0 g triethylamine (degree of neutralization 75%) and thereafter 5500 g of distilled water are added. Stirring is carried out at 40 to 50° C. until free isocyanate groups are no longer detectable. The acetone is then removed by distillation. After the addition of further distilled water for reducing the viscosity an approx. 32% finely-divided dispersion 5) with a pH value of 7.8 and a viscosity of approx. 1100 niPas/ 23° C. is obtained.

APPLICATION EXAMPLE 6 (COMPARISON)

As described in Example 3), a paint for a barrier coat is produced with the use of comparison dispersion 5) instead of dispersion 1), corresponding coatings are applied and cured, and the properties are tested.

The following test results were obtained:

Paint solids: 42%, pH value paint 8.1

Appearance of the coating after the application: Not in order, bubbles in the clear lacquer.

The paint solids are far too low, the use as barrier coat leads to unacceptable results.

EXAMPLE 7 (COMPARISON)

Polyurethane dispersion containing carbonate groups according to DE-A-3 936 794, Example A), approx. 40% solids content, viscosity approx. 50 mPas/23° C.

APPLICATION EXAMPLE 8) (COMPARISON)

As described in Example 3), a paint for a barrier coat is produced with the use of comparison dispersion 7) instead of dispersion 1), corresponding coatings are applied and cured, and the properties are tested.

The following test results were obtained:

Paint solids: 52%, pH value paint 7.5

Appearance of the coating after the application: In order to a limited extent.

(Cracking of the base coat after drying for 5 minutes at 80° C.).

Checking of the water resistance of the barrier coat after 10 minutes' drying at 70° C. drying: 5

Film hardness: 34 pendulum seconds

Solvent resistance: 2/3/3/4

The comparison example is unsuitable as a barrier coat, since a homogeneous paint construction is not achieved, and the film hardness, but above all the water resistance, is inadequate.

EXAMPLE 9 (ACCORDING TO THE INVENTION)

420 g of a polyester diol based on adipic acid, hexane diol and neopentyl glycol (molecular weight 2000) and 29.2 g of dimethylol propionic acid are weighed under nitrogen atmosphere into a dry 2 l reaction vessel with stirring, cooling and heating equipment and heated to 65° C. 10.0 g of trimethylol propane, 210 g of acetone, 114.9 g of isophorone diisocyanate and 52.9 g of hexemethylene diisocyanate are then added and heated to reflux temperature. Heating is carried out until the theoretical isocyanate value is reached or fallen slightly below. After cooling to 45° C., 20.6 g of diethyl isopropylamine (degree of neutralization 80%) and thereafter 970 g of distilled water are added. Stirring is carried out at 40 to 50° C. until free isocyanate groups are no longer detectable. The acetone is then removed by distillation. An approx. 39% finely-divided dispersion 9) with a pH value of 7.3 and a viscosity of approx. 800 mPas/23° C. is obtained.

EXAMPLE 10 (ACCORDING TO THE INVENTION)

Production of a barrier coat:

A paint for a barrier coat 10) is produced from 117 g of a pigment paste A), 195 g of the dispersion 9), 9.8 g of amino-crosslinking resin (®Cymel 328, Cytec) and 8 g of 9 distilled water. The paint has a pH value of 7.5, a solids content of 50.3% and a flow time in the ISO 5 cup of 21 seconds. After 14 days' storage of the paint at room temperature the viscosity has increased only slightly (27 seconds).

The following test results were obtained in the paint construction:

Appearance of the coating after application: In order.

Interlayer adhesion barrier coat/top coat: (marks from 1 to 3, 1 is very good, 3 is poor): 1

Interlayer adhesion barrier coat/CEC (marks from 1 to 3, 1 is very good, 3 is poor): 1

Resistance to impact from flying stones (marks from 1 to 10, 1 is very good, 10 is very poor): 1

Testing in a repair case:

Spalling of the filler (marks from 1 to 7, 1 is very good, 7 is very poor): 1

Resistance to impact from flying stones (marks from 1 to 10, 1 is very good, 10 very poor): 1

Water-resistance of the barrier coat: 1

In order to check the film hardness and the incipient solubility, a film with 20 μm dry film thickness is applied, dried for 5 minutes at 80° C. and stoved for 22 minutes at 145° C.

Film hardness: 48 pendulum seconds (Köbnig)

Solvent resistance (incipient solubility test with one minute of exposure to X/Y/Z/W, rating 0 to 5, 0 is unchanged, 5 is dissolved): 1/1/2/3

Dispersion 9) meets all the requirements.

EXAMPLE 11 (ACCORDING TO THE INVENTION)

160 g of an aliphatic polycarbonate diol (Desmophen® 2020, Bayer AG, molecular weight 2000), 120 g of a polyester diol based on adipic acid, hexane diol and neopentyl glycol (molecular weight 2000) and 19.6 g of dimethylolpropionic acid are weighed under nitrogen atmosphere into a dry 2 l reaction vessel with stirring, cooling and heating equipment. 6.70 g of trimethylol propane, 225 g of acetone and 10.4 g of ethyl diisopropylamine (degree of neutralization 55%) are then added and heating to 65° C. takes place. After the addition of 66.2 g isophorone diisocyanate and 43.3 g hexarnethylene diisocyanate, heating to reflux temperature takes place. Heating is carried out until the theoretical isocyanate value is reached or fallen slightly below. After cooling to 60° C., 625 g of distilled water is added. Stirring is carried out at 40 to 50° C. until free isocyanate groups are no longer detectable. The acetone is then removed by distillation. An approx. 40% very finely-divided dispersion 11) with a pH value of 7.7 and a viscosity of approx. 500 mPas/23° C. is obtained.

APPLICATION EXAMPLE 12 (ACCORDING TO THE INVENTION)

Production of a barrier coat:

A paint for a barrier coat 12) is produced from 117 g of a pigment paste A), 195 g of the dispersion 11), 9.8 g of amino-crosslinking resin (®C. ymel 328, Cytec) and 8 g of distilled water. The paint has a pH value of 7.4, a solids content of approx. 50.5% and a flow time in the ISO 5 cup of 16 seconds. After 14 days' storage of the paint at room temperature the viscosity has increased only slightly (18 seconds).

The following test results were obtained in the paint construction:

Appearance of the coating after application: In order.

Inter-layer adhesion barrier coat/top coat: (marks from 1 to 3, 1 is very good, 3 is poor): 1

Interlayer adhesion barrier coat/CEC (marks from 1 to 3, 1 is very good, 3 is poor): 1

Resistance to impact from flying stones (marks from 1 to 10, 1 is very good, 10 is very poor): 1

Testing in a repair case:

Spalling of the filler (marks from 1 to 7, 1 is very good, 7 is very poor): 1

Resistance to impact from flying stones (marks from 1 to 10, 1 is very good, 10 very poor): 1

Water resistance of the barrier coat: 1

In order to check the film hardness and the incipient solubility, a film with 20 μm dry film thickness is applied, dried for 5 minutes at 80° C. and stoved for 22 minutes at 145° C.:

Film hardness: 53 pendulum seconds (König)

Solvent resistance (testing of incipient solubility with one minute loading with X/Y/Z/W, rating 0 to 5, 0 is unchanged, 5 is dissolved): 2/2/2/2

Dispersion 11) meets all the requirements.

EXAMPLE 13 (ACCORDING TO THE INVENTION)

272 g of an aliphatic polycarbonate diol (Desmophen® 2020, Bayer AG, molecular weight 2000), 272 g of a polyester diol based on adipic acid, hexane diol and neopentyl glycol (molecular weight 1700) and 26.8 g of dimethylolpropionic acid are weighed under nitrogen atmosphere into a dry 2 l reaction vessel with stirring, cooling and heating equipment and heated to 65° C. 11.3 g of trimethylol propane, 250 g of acetone, 106.6 of isophorone diisocyanate and 75.9 of g of hexamethylene diisocyanate and 0.025% of dibutyltin dilaurate are then added and heating to reflux temperature takes place. Heating is carried out until the theoretical isocyanate value is reached or fallen slightly below. After cooling to 45° C., 17.2 g of triethylamine degree of neutralization 85%) and then 1250 g of distilled water are added. Stirring is carried out at 40 to 50° C. until free isocyanate groups are no longer detectable. The acetone is then removed by distillation. An approx. 38% very finely-divided dispersion 13) with a pH value of 7.7 and a viscosity of approx. 7500 mPas/23° C. is obtained.

APPLICATION EXAMPLE 14) (ACCORDING TO THE INVENTION)

Production of a barrier coat:

A paint for a barrier coat 10) is produced from 117 g of a pigment paste A), 209 g of the dispersion 13), 9.8 g of amino-crosslinking resin (®Cymel 328, Cytec) and 8 g of distilled water. The paint has a pH value of 7.5, a solids content of approx. 49% and a flow time in the ISO 5 cup of 15 seconds. After 14 days' storage of the paint at room temperature the viscosity has increased only slightly (17 seconds).

The following test results were obtained on the paint construction:

Appearance of the coating after application: In order.

Inter-layer adhesion barrier coat/top coat: (marks from 1 to 3, 1 is very good, 3 is poor): 1

Interlayer adhesion barrier coat/CEC (marks from 1 to 3, 1 is very good, 3 is poor): 1

Resistance to impact from flying stones (marks from 1 to 10, 1 is very good, 10 is very poor): 1

Testing in a repair case:

Spalling of the filler (marks from 1 to 7, 1 is very good, 7 is very poor): 1

Resistance to impact from flying stones (marks from 1 to 10, 1 is very good, 10 very poor): 1

Water resistance of the barrier coat: 1

In order to check the film hardness and the incipient solubility, a film with 20 μm dry film thickness is applied, dried for 5 minutes at 80° C. and stoved for 22 minutes at 145° C.:

Film hardness: 41 pendulum seconds (König)

solvent resistance: 2/2/2/3 dispersion 13) meets all the requirements, however the film hardness is in the lower range of the acceptable values due to the reduced content of dimethylol propionic acid.

What is claimed is:

1. An aqueous polyurethane dispersion, wherein the polyurethane comprises the reaction product of
   A) 55 to 75 wt. % of a mixture of 20 to 80 wt. % of an aliphatic polyester diol having a number average molecular weight of 840 to 2100 and 80 to 20 wt. % of an aliphatic polycarbonate diol or polyester carbonate diol having a number average molecular weight of 1000 to 2100,
   B) 1 to 3 wt. % of a trifunctional, low molecular weight alcohol,
   C) 20 to 35 wt. % of isophorone diisocyanate and/or hexamethylene diisocyanate, or a mixture of 4,4'-diisocyanatodicyclohexyl-methane with isophorone diisocyanate or hexamethylene diisocyanate and
   D) 3.5 to 4.9 wt. % of dimethylol propionic acid,
      wherein a neutralizing agent is added in an amount sufficient to neutralize 40 to 105% of the acid groups and an amount sufficient to neutralize at least 40% of the acid groups is added prior to the chain extension reaction, wherein at least 1 wt. % of components A) and B), based on the total weight of components A) to D), are tri- or higher-functional compounds and wherein the polyurethane contains 1 to 4 wt. % of the urea groups set forth in brackets in the following formula:

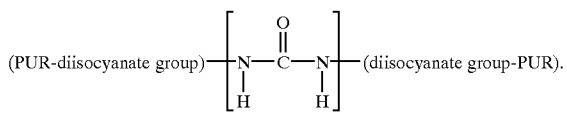

2. The aqueous polyurethane dispersion of claim 1, wherein the polyurethane comprises the reaction product of
   A) 55 to 75 wt. % of an aliphatic polyester diol prepared from adipic acid, hexanediol and neopentyl glycol and having a number average molecular weight of 1700 to 2100,
   B) 1 to 3 wt. % of a trifunctional, low molecular weight alcohol,
   C) 20 to 35 wt. % of isophorone diisocyanate and/or hexamethylene diisocyanate, or a mixture of 4,4'-iisocyanatodicyclohexyl-methane with Isopharone diisocyanate or hexamethylene diisocyanate and
   D) 3.5 to 4.9 wt. % of dimethylol propionic acid,
      wherein a neutralizing agent is added in an amount sufficient to neutralize 40 to 105% of the acid groups and an amount sufficient to neutralize at least 40% of the acid groups is added prior to the chain extension reaction, wherein at least 1 wt. % of components A) and B), based on the total weight of components A) to D), are tri- or higher-functional compounds and wherein the polyurethane contains 1 to 4 wt. % of the urea groups set forth In brackets in the following formula:

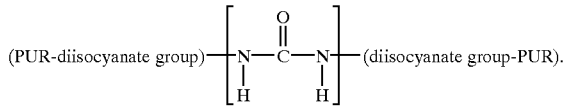

3. The aqueous polyurethane dispersion of claim 1, wherein the tri- or higer-functional raw material are obtained exclusively from component B).

4. The aqueous polyurethane dispersion of claim 1, wherein the number average molecular weight (Mn) of the polyurethane is >30,000 g/mole.

5. The aqueous polyurethane dispersion of claim 1, wherein the aqueous polyurethane dispersion is solvent-free, the acid number, based on solids, is <20 mg KOH/g substance and the number average molecular weight (Mn) of the polyurethane is >30,000 g/mole.

6. A process for preparing a polyurethane dispersion comprising forming an isocyanate- and acid-functional polyurethane by reacting
   A) 55 to 75 wt. % of a mixture of 20 to 80 wt. % of an aliphatic polyester diol having a number average molecular weight of 840 to 2100 and 80 to 20 wt. % of an aliphatic polycarbonate diol or polyester carbonate diol having a number average molecular weight of 1000 to 2100,
   B) 1 to 3 wt. % of a trifunctional, low molecular weight alcohol,
   C) 20 to 35 wt. % of isophorone diisocyanate and/or hexamethylene diisocyanate, or a mixture of 4,4'-diisocyanatodicyclohexyl-methane with isophorone diisocyanate or hexamethylene diisocyanate and
   D) 3.5 to 4.9 wt. % of dimethylol propionic acid,
      adding a neutralizing agent in an amount sufficient to neutralize 40 to 105% of the acid groups and dispersing the prepolymer in water, chain extending said prepolymer in water at 25 to 75° C., and removing organic solvent during or after formation of the dispersion or during or after the chain extension reaction so that the amount of organic solvent comprises less than 5%, based on the weight of the aqueous dispersion.

7. A process for preparing a polyurethane dispersion comprising forming an isocyanate- and acid-functional polyurethane by reacting
   A) 55 to 75 wt. % of a mixture of 20 to 80 wt. % of an aliphatic polyester diol having a number average molecular weight of 840 to 2100 and 80 to 20 wt. % of an aliphatic polycarbonate diol or polyester carbonate diol having a number average molecular weight of 1000 to 2100,
   B) 1 to 3 wt. % of a trifunctional, low molecular weight alcohol,
   C) 20 to 35 wt. % of isophorone diisocyanate and/or hexamethylene diisocyanate, or a mixture of 4,4'-diisocyanatodicyclohexyl-methane with isophorone diisocyanate or hexamethylene diisocyanate and
   D) 3.5 to 4.9 wt. % of dimethylol propionic acid, in the presence of a neutralizing agent in an amount sufficient to neutralize 40 to 105% of the acid groups with dispersing the resulting prepolymer in water,
   chain extending said prepolymer in water at 25° C. to 75° C., and
   removing organic solvent during or after formation of the dispersion or during or after the chain extension reaction so that the amount of organic solvent comprises less than 5%, based on the weight of the aqueous dispersion.

8. A coating composition comprising
   a) 30 to 90 wt. % of a polyurethane dispersion wherein the polyurethane comprises the reaction product of
      A) 55 to 75 wt. % of a mixture of 20 to 80 wt. % of an aliphatic polyester diol having a number average molecular weight of 840 to 2100 and 80 to 20 wt. % of an aliphatic polycarbonate diol or polyester carbonate diol having a number average molecular weight of 1000 to 2100,
      B) 1 to 3 wt. % of a trifunctional, low molecular weight alcohol,
      C) 20 to 35 wt. % of isophorone diisocyanate and/or hexamethylene diisocyanate, or a mixture of 4,4'-diisocyanatodicyclohexyl-methane with isophorone diisocyanate or hexamethylene diisocyanate and
      D) 3.5 to 4.9 wt. % of dimethylol propionic acid,
      wherein a neutralizing agent is added in an amount sufficient to neutralize 40 to 105% of the acid groups and an amount sufficient to neutralize at least 40% of the acid groups is added prior to the chain extension reaction, wherein at least 1 wt. % of components A) and B), based on the total weight of components A) to D), are tri- or higher-functional compounds and wherein the polyurethane contains 1 to 4 wt. % of the urea groups set forth in brackets in the following formula:

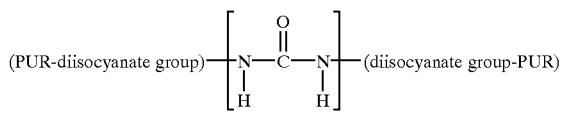

b) up to 20 wt. % of a crosslinking agent,
   c) 5 to 70 wt. % of a pigment and/or filler,
   d) up to 65 wt. % of a binder other than a).

9. The coating composition of claim 8, wherein the crosslinking agent b) comprises at least one of a melamine resin, blocked polyisocyanate and a trisalkoxycarbonylaminotriazine.

10. The coating composition of claim 8, wherein the composition contains less than 2.5 wt. % of organic solvent, based on the weight of the composition, and crosslinking agent b) comprises a melamine resin and binder d) comprises a water dispersible polyester resin.

11. A coating composition comprising the aqueous polyurethane resin of claim 1, a water dispersible melamine resin, a hydrophilic polyisocyanate and/or a polyester or polyester polyurethane, wherein the composition is suitable for the preparation of a light fast, naturally rapidly drying coating with very good water resistance and hardness.

12. The aqueous dispersion of one of claim 1 or 2, wherein the neutralizing agent comprises at least one member selected from the group consisting of triethylamine, N-methyl morpholine, dimethy-isopropylamine, diisopropylaminoethanol, dimethyl ethanolamine, dimethyl isopropanolamine, ammonia and mixtures thereof.

13. The process of one of claim 6 or 7, further including adding additional neutralizing agent in an amount sufficient to neutralize 105% of the acid groups.

14. The process of one of claim 6 or 7, wherein the neutralizing agent comprises at least one member selected from the group consisting of triethylamine, N-methyl morpholine, dimethy-isopropylamine, diisopropylaminoethanol, dimethyl ethanolamine, dimethyl isopropanolamine, ammonia and mixtures thereof.

* * * * *